United States Patent
Chojecki et al.

(10) Patent No.: US 7,952,332 B2
(45) Date of Patent: May 31, 2011

(54) VOLTAGE GENERATOR ARRANGEMENT AND METHOD FOR VOLTAGE CONVERSION

(75) Inventors: Pawel Chojecki, Graz (AT); Richard Forsyth, Graz (AT); Thomas Schrei, Graz (AT)

(73) Assignee: austriamicrosystems AG, Unterpremstätten (AT)

( * ) Notice: Subject to any disclaimer, the term of this patent is extended or adjusted under 35 U.S.C. 154(b) by 22 days.

(21) Appl. No.: 12/300,891

(22) PCT Filed: May 15, 2007

(86) PCT No.: PCT/EP2007/004325
§ 371 (c)(1),
(2), (4) Date: Jun. 8, 2009

(87) PCT Pub. No.: WO2007/131779
PCT Pub. Date: Nov. 22, 2007

(65) Prior Publication Data
US 2010/0045255 A1  Feb. 25, 2010

(30) Foreign Application Priority Data
May 15, 2006 (EP) .................................. 06009973

(51) Int. Cl.
*G05F 1/00* (2006.01)

(52) U.S. Cl. .......................... 323/222; 323/271; 323/282

(58) Field of Classification Search .................. 323/222, 323/223, 271, 282
See application file for complete search history.

(56) References Cited

U.S. PATENT DOCUMENTS

| | | | |
|---|---|---|---|
| 4,949,309 A * | 8/1990 | Rao | 365/185.12 |
| 5,818,209 A * | 10/1998 | Masini et al. | 323/289 |
| 6,278,245 B1 * | 8/2001 | Li et al. | 315/307 |
| 6,282,109 B1 | 8/2001 | Fraidlin et al. | |
| 6,717,388 B2 | 4/2004 | Smidt et al. | |

FOREIGN PATENT DOCUMENTS

| | | |
|---|---|---|
| DE | 101 26 236 | 12/2002 |
| EP | 0 504 094 | 9/1992 |
| EP | 0 994 499 | 4/2000 |
| JP | 61 277368 | 12/1986 |

* cited by examiner

*Primary Examiner* — Adolf Berhane
*Assistant Examiner* — Nguyen Tran
(74) *Attorney, Agent, or Firm* — Cohen Pontani Lieberman & Pavane LLP (57) ABSTRACT

A voltage generator arrangement which comprises a voltage converter (40) and a polarity detection circuit (10). The voltage converter (40) is coupled to a supply voltage terminal (9) and an output terminal (7) and comprises a first mode of operation (P1) for a positive supply voltage (VIN) and a second mode of operation (P2) for a negative supply voltage (VIN). The polarity detection circuit (10) is coupled to the supply voltage terminal (9) and a control input terminal (47) of the voltage converter (40), for providing a first pilot signal (SP1) depending on the polarity of the supply voltage (VIN).

16 Claims, 5 Drawing Sheets

U.S. Pat. No. 7,952,332 B2

VOLTAGE GENERATOR ARRANGEMENT AND METHOD FOR VOLTAGE CONVERSION

RELATED APPLICATIONS

This is a U.S. national stage under 35 USC §371 of application No. PCT/EP2007/004325, filed on May 15, 2007.

This application claims the priority of European application No. 06009973.6 filed May 5, 2006, the entire content of which is hereby incorporated by reference.

FIELD OF THE INVENTION

The present invention relates to a voltage generator arrangement and a method for voltage conversion.

BACKGROUND OF THE INVENTION

Voltage converter arrangements are widely used for up-conversion or down-conversion of a supply voltage to generate an output voltage for a circuit. Voltage converters used for down-conversion are, for example, buck mode converters, whereas voltage converters for up-conversion are, for example, boost converters. Voltage converter arrangements are common in devices for mobile communication and digital cameras, for example.

Document U.S. Pat. No. 6,717,388 B2 shows a buck converter with two switches and one inductor.

SUMMARY OF THE INVENTION

It is an object of the present invention to provide a voltage generator arrangement and a method for voltage conversion achieving high flexibility and improved efficiency.

A voltage generator arrangement comprises a voltage converter and a polarity detection circuit. The polarity detection circuit is coupled to a supply voltage terminal and is connected to a control input terminal of the voltage converter. The voltage converter is also coupled to the supply voltage terminal and is connected to an output terminal of the voltage generator arrangement.

The polarity detection circuit generates a first pilot signal depending on the polarity of a supply voltage, received at the supply voltage terminal. The polarity detection circuit provides this pilot signal to the control input terminal of the voltage converter. The voltage converter comprises a first mode of operation when a positive supply voltage is detected and a second mode of operation when a negative supply voltage for generating an output voltage is detected. The output voltage is provided at the output terminal of the voltage generator arrangement. Therefore, the mode of operation depends on the polarity of the supply voltage which is detected by the polarity detection circuit. For example, the voltage converter can be operated in a normal mode of operation or an inverting mode of operation depending on the detected polarity.

The voltage generator arrangement can configure itself according to the polarity of the supply voltage. Because the mode of operation of the voltage generator arrangement depends on the polarity of the supply voltage, positive and negative supply voltages can be used to generate the output voltage with high efficiency. The supply voltage can be an approximately constant voltage or an alternating voltage.

In an embodiment, the supply voltage is provided to the supply voltage terminal with reference to a ground potential terminal. The voltage converter provides the output voltage at the output terminal with reference to the ground potential terminal. Referencing the supply voltage and the output voltage to the same ground potential terminal leads to a cost effective design and improved safety of the voltage generator arrangement.

In a preferred embodiment, the polarity detection circuit and the voltage converter are coupled to the ground potential terminal. The polarity detection circuit preferably generates the first pilot signal depending on the polarity of the supply voltage with reference to the ground potential terminal.

In an embodiment, the first mode of operation is a normal mode of operation and the second mode of operation is an inverted mode of operation.

In an alternative embodiment, the first mode of operation is the normal mode of operation and the second mode of operation is a mode of operation in which the voltage converter is in a deactivated state. The voltage converter provides no energy to the output terminal in the deactivated state. The deactivated state can also be described as inactive or idle state.

In an alternative embodiment, the voltage converter comprises the first mode of operation which is a normal mode of operation, the second mode of operation which is an inverted mode of operation and a third mode of operation in which the voltage converter is in the deactivated state.

In a preferred embodiment, the voltage converter is realized for down-conversion of the supply voltage.

In an embodiment, the voltage converter comprises a first and a second inductor terminal which can be used for coupling an inductor to the voltage converter.

In another embodiment, the voltage converter further comprises a first switch which couples the supply terminal to the first inductor terminal and a second switch which couples the first inductor terminal to a ground potential terminal. The output terminal is coupled to the second inductor terminal. A buck-conversion can be performed using this embodiment and positive supply voltages can be converted into a positive output voltage. The voltage converter may advantageously comprise the first mode of operation which is a normal buck mode of operation.

In an embodiment, the voltage converter may comprise the first mode of operation which is the normal buck mode of operation and the third mode of operation in which the voltage converter is in the deactivated state.

In a further development, the voltage converter comprises a third switch which couples the second inductor terminal to the ground potential terminal, a fourth switch which couples the second inductor terminal to the output terminal and a fifth switch which couples the first inductor terminal to the output terminal. An inverting-buck conversion can be performed using this embodiment. Therefore, also negative supply voltages can be used for generating the positive output voltage. The voltage converter may advantageously comprise the first mode of operation which is the normal buck mode of operation and the second mode of operation which is an inverted buck mode of operation.

In an embodiment, the voltage converter may comprise the first mode of operation which is the normal buck mode of operation, the second mode of operation which is the inverted buck mode of operation and the third mode of operation in which the voltage converter is in the deactivated state.

In an embodiment, the polarity detection circuit is connected to a further control input terminal of the voltage converter, so that the polarity detection circuit is able to provide a validity signal depending on the validity of the first pilot signal to the voltage converter.

In an embodiment, the polarity detection circuit comprises also zero detection means and is coupled to an additional control input terminal of the voltage converter. The polarity detection circuit may generate an additional pilot signal with a first value, if the supply voltage is approximately zero, and having a second value, if the absolute value of the supply voltage significantly differs from zero.

The voltage converter comprises a control circuit which is connected to the control input terminal of the voltage converter.

In an embodiment, the control circuit is designed to provide a second pilot signal if the supply voltage is higher than a first threshold voltage. In a further development the control circuit provides a third pilot signal, if the supply voltage is lower than a second threshold voltage. Both threshold voltages may approximately have the same absolute value.

In an embodiment, both threshold voltages preferably may have values different from 0 Volt. The first threshold voltage and the second threshold voltage may preferably be different.

The first threshold voltage preferably has a positive value. The second threshold voltage preferably has a negative value that corresponds to the inverted positive value.

In a further development, the control circuit is designed to provide a fourth pilot signal, if the supply voltage is between the first threshold voltage and the second threshold voltage.

In an embodiment, the control circuit comprises a first and a second comparator as well as a logic circuit which is coupled to the output terminals of the first and the second comparator. The two comparators are used for the comparison of the supply voltage with the first and the second threshold voltage, respectively. The first comparator may comprise a first input terminal, which is connected to the supply voltage terminal, and a second input terminal to which the first threshold voltage is applied. The second comparator may comprise a first input terminal, to which the second threshold voltage is applied, and a second input terminal, which is connected to the supply voltage terminal. The logic circuit is connected to the output of the first and the second comparator, respectively. An output terminal of the logic circuit provides the fourth pilot signal in case of the supply voltage being between the first threshold voltage and the second threshold voltage.

In an embodiment, the control circuit is coupled to the output terminal of the voltage converter. Therefore, the output voltage is provided to the control circuit for power supply purposes of the control circuit.

In a preferred embodiment, the voltage converter arrangement is realized using a semiconductor body, to which the inductor is coupled. The five switches may be designed as bipolar transistors. Alternatively, the switches can comprise field-effect transistors. Preferably, the five switches are designed as metal-oxide-semiconductor field-effect transistors.

The voltage converter arrangement can be used for down-conversion of a relatively high supply voltage.

The voltage converter arrangement can be arranged in a portable device for mobile communication, a digital camera or a laptop computer.

According to an aspect of the invention, a method for voltage conversion comprises the steps of measuring a polarity of a supply voltage and controlling a voltage converter depending on the polarity of the supply voltage. One advantage of this method is that supply voltages of arbitrary polarity can be used for generating an output voltage, thus resulting in higher efficiency.

The voltage converter may be a direct current/direct current converter.

In an embodiment, the supply voltage is provided with reference to a ground potential terminal and the output voltage is generated with reference to the ground potential terminal by means of the voltage converter. A ground potential is provided at the ground potential terminal.

The step of detecting the polarity of the supply voltage can comprise the step of comparing the supply voltage with a first threshold voltage and the step of comparing the supply voltage with a second threshold voltage, which preferably has a sign which is the opposite of the sign of the first threshold voltage.

In an embodiment, the voltage converter operates in a first mode of operation in case of the supply voltage being higher than the first threshold voltage. In an embodiment, the voltage converter is set in a second mode of operation in case of the supply voltage being lower than the second threshold voltage.

BRIEF DESCRIPTION OF THE DRAWINGS

The following description of figures of exemplary embodiments may further illustrate and explain the invention. Devices with the same structure or with the same effect respectively appear with equivalent reference numerals. A description of a part of a circuit or a device having the same function in different figures might not be repeated in every of the following figures.

DETAILED DESCRIPTION OF THE DRAWINGS

Figure 1:
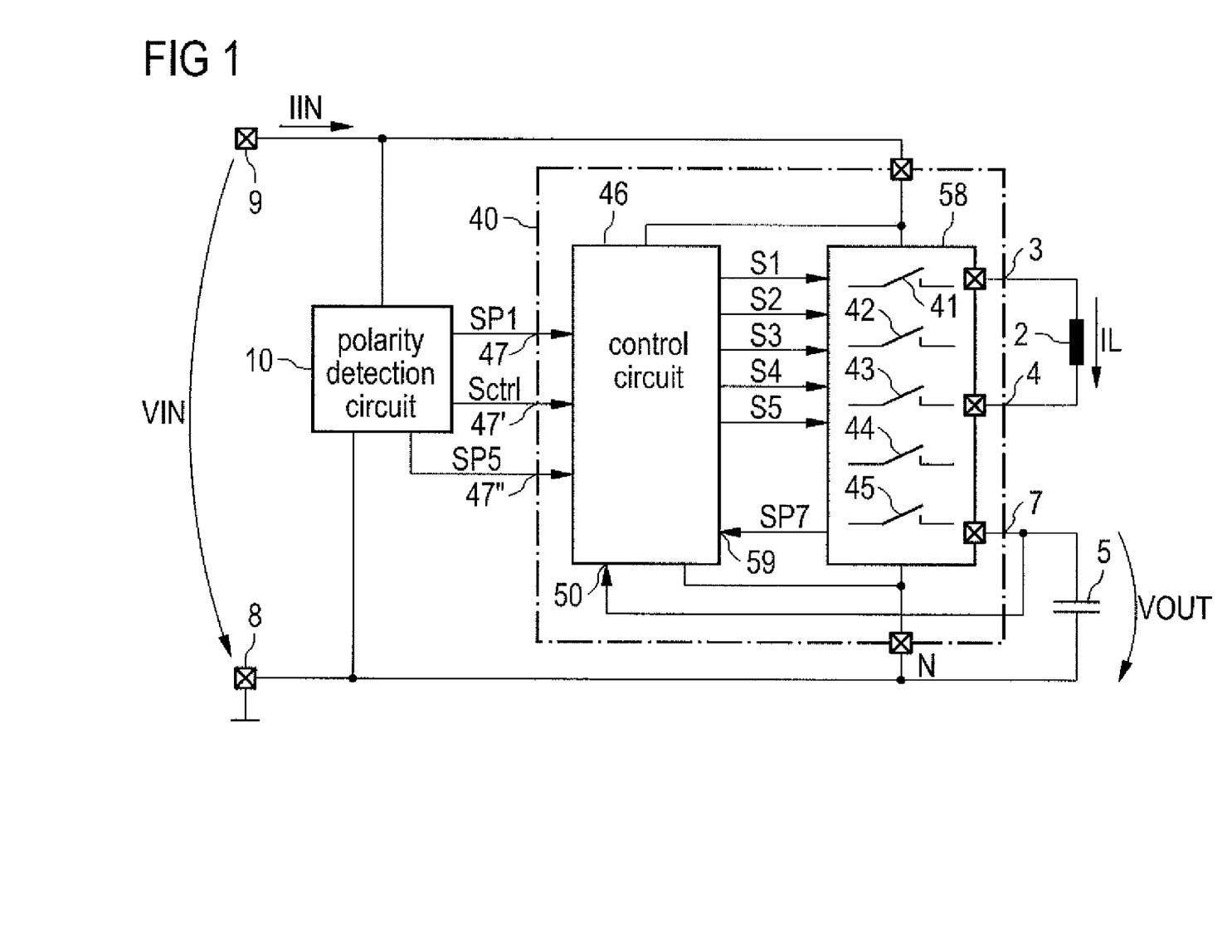
FIG. 1 shows a schematic of an exemplary embodiment of a voltage generator arrangement according to the invention.

FIG. 1 shows an example of a block diagram of a voltage generator arrangement according to the invention. The voltage generator arrangement comprises a polarity detection circuit 10 and a voltage converter 40. Both are connected to a supply voltage terminal 9 and a ground potential terminal 8, respectively. A first output terminal of the polarity detection circuit 10 is connected to a control input terminal 47 of the voltage converter 40. A second and a third output terminal of the polarity detection circuit 10 are connected to two further control input terminals 47', 47" of the voltage converter 40. The voltage converter 40 comprises a control circuit 46, a switch array 58, a first and a second inductor terminal 3, 4 and an output terminal 7. An inductor 2 can be coupled to the first inductor terminal 3 and the second inductor terminal 4. The inductor 2 can be realized as a coil. The control circuit 46 and the switch array 58 are connected to the ground potential terminal 8 and the supply voltage terminal 9. A terminal 50 of the control circuit 46 is connected to the output terminal 7. A capacitor 5 couples the output terminal 7 to the ground potential terminal 8. The control circuit 46 is coupled to the five switches 41 to 45 of the switch array 58. The switch array 58 is connected to a current feedback input terminal 59 of the control circuit 46.

An input voltage VIN is applied to the supply voltage terminal 9 with reference to the ground potential terminal 8. The polarity detection circuit 10 provides a first pilot signal SP1, a validity signal Sctrl and a fifth pilot signal SP5 to the control input terminals 47, 47', 47" of the control circuit 46. The first pilot signal SP1 is generated depending on the polarity of the input voltage VIN. The validity signal Sctrl indicates if the value of the first pilot signal SP1 is valid. The fifth pilot signal SP5 is generated, if the input voltage VIN is zero or has a small value. A seventh pilot signal SP7 comprising information about the magnitude of the supply current IIN, which flows through the supply voltage terminal 9, is provided to the current feedback input terminal 59 of the control circuit 46 via the switch array 58. The control circuit 46 generates a first, a second, a third, a fourth and a fifth control signal S1 to S5 which are provided to the switch array 58 for the control of the positions of the five switches 41 to 45. The five control signals S1 to S5 may be provided to the switch array 58 depending on the first and the fifth pilot signal SP1, SP5, the validity signal Sctrl, the supply voltage VIN, an output voltage VOUT and the supply current IIN. The switch array 58 generates the output voltage VOUT. The output voltage VOUT is provided at the output terminal 7 with reference to the ground potential terminal 8 by the switch array 58 of the voltage converter 40.

It is an advantage of the voltage generator arrangement that the positions of the five switches 41 to 45 are controlled depending on the polarity of the supply voltage VIN which is detected by the polarity detection circuit 10.

In an embodiment, an electric load which is not shown in FIG. 1 is arranged between the output terminal 7 and the ground potential terminal 8. In an embodiment, an alternating voltage source which is not shown in FIG. 1 is connected between the supply voltage terminal 9 and the ground potential terminal 8.

Figure 2:
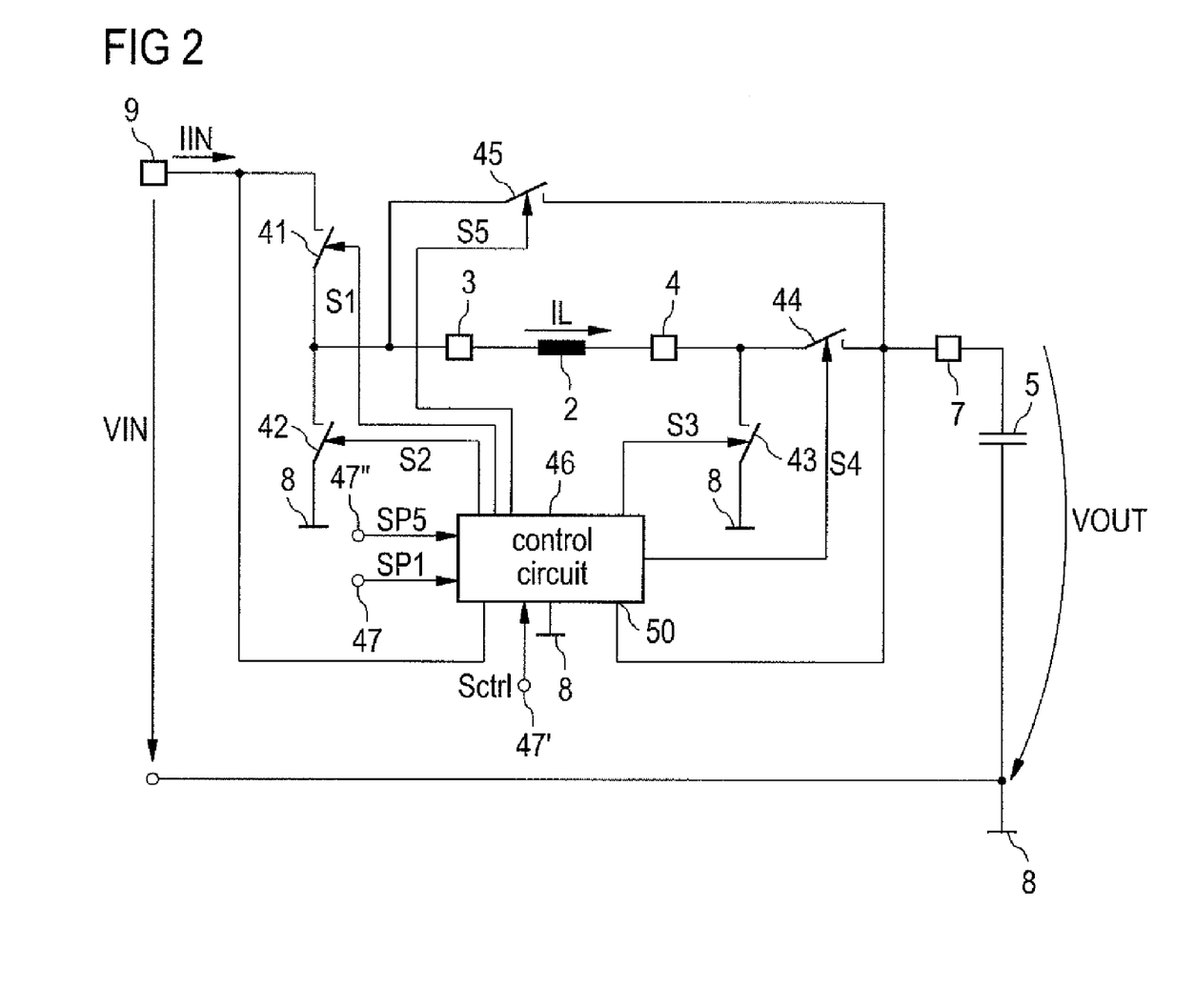
FIG. 2 shows an exemplary embodiment of a voltage converter according to the invention.

FIG. 2 shows an exemplary embodiment of a voltage converter 40 comprising a control circuit 46 according to the present invention. The voltage converter 40 comprises the first and the second inductor terminals 3, 4 to which the inductor 2 is coupled. The voltage converter 40 also comprises five switches 41 to 45. The first switch 41 couples the supply voltage terminal 9 to the first inductor terminal 3, the second switch 42 couples the first inductor terminal 3 to the ground potential terminal 8. The third switch 43 couples the second inductor terminal 4 to the ground potential terminal 8 and the fourth switch 44 couples the second inductor terminal 4 to the output terminal 7. The fifth switch 45 is for coupling the first inductor terminal 3 to the output terminal 7. The capacitor 5 is connected between the output terminal 7 and the ground potential terminal 8. An electric load which is not shown in FIG. 2 can be connected to the output terminal 7 and to the ground potential terminal 8.

The control circuit 46 comprises five output terminals which are connected to the respective control terminals of the five switches 41 to 45. The control circuit 46 is also connected to the control input terminals 47, 47', 47", the supply voltage terminal 9 and the output terminal 7.

The capacitor 5 is used for stabilization of the output voltage VOUT.

It is an advantage of the voltage converter 40 that a down-conversion of the supply voltage VIN in a buck mode of operation and an inverted-buck mode of operation are possible. The positions of the five switches 41 to 45 and the timing schedule are explained in FIG. 3B.

Figure 3A:
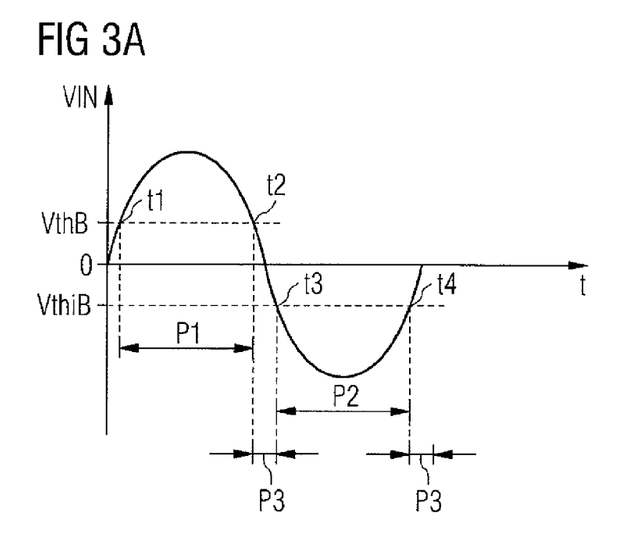
FIGS. 3A and 3B show the supply voltage and the positions of the switches in the voltage generator according to examples and FIGS. 4A and 4B show examples of a polarity detection circuit and a control logic.

FIG. 3A shows an example of a supply voltage VIN. According to this example, the supply voltage VIN is an alternating voltage with a periodic positive and a negative polarity, for example a sinusoidal DC-free signal. Three modes of operation P1, P2, P3 are provided. When the supply voltage VIN is larger than the first threshold voltage VthB, the first mode of operation P1 is selected by the control circuit 46. The first mode of operation P1 lasts from a point of time t1 to a point of time t2. The voltage generator arrangement is in a second mode of operation P2, when the supply voltage VIN drops below a second threshold voltage VthiB. This is the case between a point of time t3 and a point of time t4. In a third mode of operation P3, the supply voltage VIN is below the first threshold voltage VthB and above the second threshold voltage VthiB. This is the case between the point of time t2 and the point of time t3. Both threshold voltages VthB, VthiB have the same absolute value. The first threshold voltage VthE has a positive sign and the second threshold voltage VthiB has a negative sign.

Figure 3B:
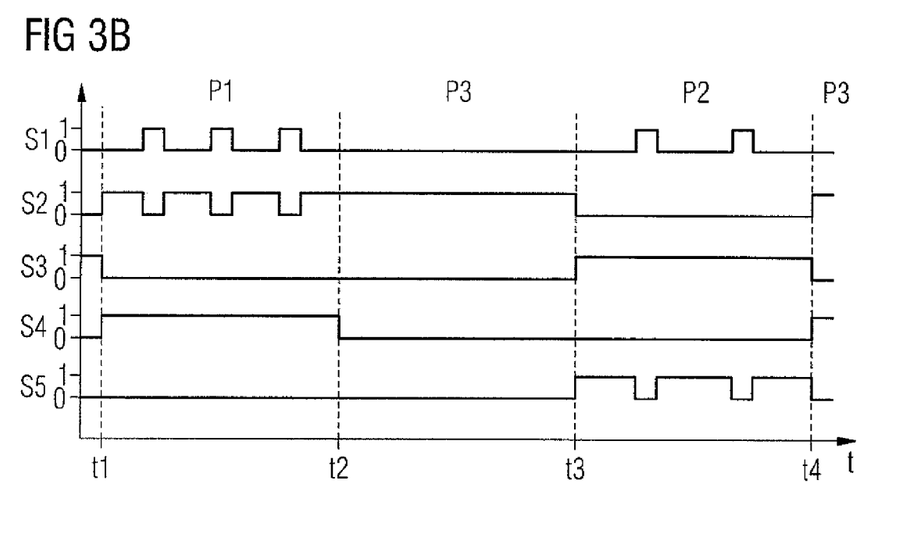

FIG. 3B shows an exemplary timing schedule of the five control signals S1 to S5 during the three modes of operation P1, P2, P3. During the first mode of operation P1, the third and the fifth control signal S3 and S5 are in a low-state, which is the value 0, and the corresponding switches, the third and the fifth switch 43, 45, are open. The fourth control signal S4 is in a high-state, which is the value 1, and the corresponding fourth switch 44 is closed. The first and the second control signals S1, S2 are changing during the mode of operation P1 from the high-state to the low-state and back. The first and the second switch 41, 42 are alternating in an open position or in a closed position in the first mode of operation P1. The second control signal S2 is inverted in comparison to the first control signal S1. Therefore, the second switch 42 will be closed in the first mode of operation P1, if the first switch 41 is open, and vice versa. In a first phase at the start of the first mode of operation P1, the first, the third and the fifth switches 41, 43, 45 are open, and the second and the fourth switches 42, 44 are closed. After the first phase and according to the switching positions of the five switches 41 to 45, an inductor current IL flows from the supply voltage terminal 9 through the first switch 41, the inductor 2, the fourth switch 44 and the output terminal 7 to the capacitor 5. After that the first switch 41 is closed and the second switch 42 is opened, so that the inductor current IL flows from the ground potential terminal 8 through the second switch 42, the inductor 2, the fourth switch 44 and the output terminal 7 to the capacitor 5.

In the third mode of operation P3, the first, the third, the fourth and the fifth control signal S1, S3, S4, S5 are in the low-state and the corresponding switches 41, 43, 44, 45 are in an open position, while the second control signal S2 is in the high-state and the corresponding second switch 42 is in a closed position. In the third mode of operation P3, the output voltage VOUT is provided by the energy stored in the capacitor 5. The energy of the inductor 2 is discharged and the voltages of the first and the second inductor terminals 3, 4 are set to zero by closing the second switch 42.

In the second mode of operation P2, the second and the fourth control signal S2, S4 are in the low-state and the corresponding second and fourth switch 42, 44 are in an open position. The third control signal S3 is in the high-state and the corresponding third switch 43 is in a closed position. The first and the fifth control signal S1, S5 are in the low-state and periodically alternating in the high-state in such a way that the fifth control signal S5 is the inverted signal of the first control signal S1. Therefore, the first switch 41 is in an open position if the fifth switch 45 is in a closed position and vice versa. In a first phase at the start of the second mode of operation P2, the first, the second and the fourth switches 41, 42, 44 are open, and the third and the fifth switches 43, 45 are closed. After the first phase, the inductor current IL flows from ground potential terminal 8 through the third switch 43, the inductor 2 and the first switch 41 to the supply voltage terminal 9. Because the supply voltage VIN has a negative value in the second mode of operation P2, the direction of the inductor current IL is from the second inductor terminal 4 to the first inductor terminal 3. When the first switch 41 is set in an open position and the fifth switch 45 is set in a closed position, the inductor current IL continues to flow from the ground potential terminal 8 through the third switch 43, the inductor 2, the fifth switch 45 and the output terminal 7 to the capacitor 5 and increases the amount of energy stored in the capacitor 5.

The first mode of operation P1 is therefore a buck mode of operation and the second mode of operation P2 is an inverted buck mode of operation.

It is an advantage of the voltage generator arrangement that the supply voltage VIN with a positive polarity and with a negative polarity can be used for the generation of an output voltage VOUT.

If the supply voltage is a positive, constant voltage, then the first mode of operation P1 can be applied. In an embodiment, the third mode of operation P3, in which the voltage generator 40 is in the deactivated state, can be applied alternating to the first mode of operation P1.

If in contrary the supply voltage is a negative, constant voltage, then the second mode of operation P2 can by applied. In an embodiment, the third mode of operation P3 can be applied to switch the voltage generator 40 in the deactivated state alternating to the second mode of operation P2. Therefore, the voltage generator arrangement is very flexible and efficient in the use of different supply voltages.

In an alternative switching schedule the third switch 43 is closed in the third mode of operation P3 for discharging the inductor 2 in addition to the closed second switch 42 or alternatively to the second switch 42.

In an alternative embodiment which is not shown, the first phase of the first mode of operation P1 in which the first, the third and the fifth switches 41, 43, 45 are open and the second and the fourth switches 42, 44 are closed is omitted. Thus, the first mode of operation P1 starts with a phase in which the second, the third and the fifth switch 42, 43, 45 are open and the first and the fourth switch 41, 44 are closed.

In an alternative embodiment which is not shown, the first phase of the second mode of operation P2 in which the first, the second and the fourth switches 41, 42, 44 are open and the third and the fifth switches 43, 45 are closed is omitted. Thus, the second mode of operation P2 starts with a phase in which the second, the fourth and the fifth switch 42, 44, 45 are open and the first and the third switch 41, 43 are closed.

Figure 4A:
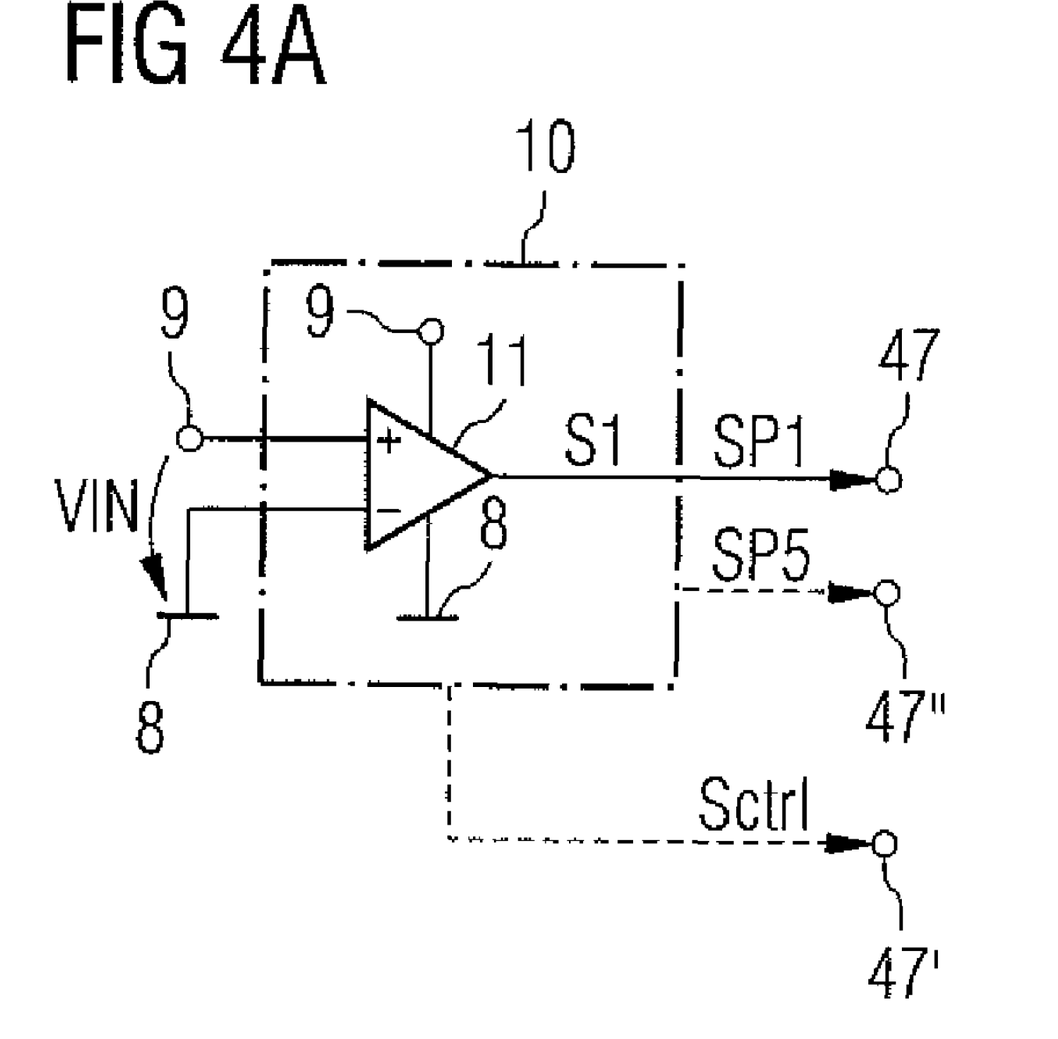

FIG. 4A shows an exemplary embodiment of a polarity detection circuit 10 which comprises a first comparator 11. A first input terminal of the first comparator 11 is coupled to the supply voltage terminal 9 and a second input terminal of the first comparator 11 is coupled to the ground potential terminal 8. An output terminal of the first comparator 11 is connected to the control input terminal 47 of the voltage converter 40.

The first comparator 11 generates a first pilot signal SP1 depending on the polarity of the supply voltage VIN in comparison with a voltage at the ground potential terminal 8. The voltage at the ground potential terminal 8 may preferably be 0 Volt.

Figure 4B:
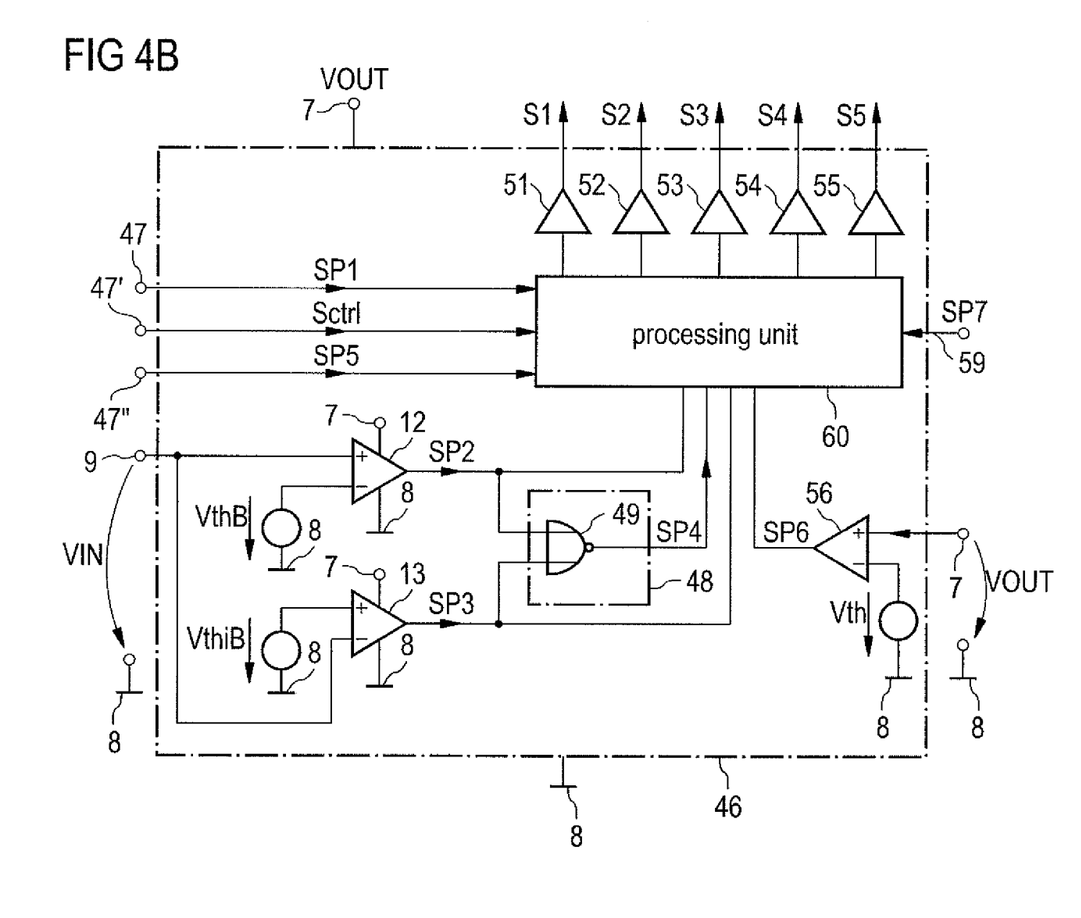

FIG. 4B shows an exemplary embodiment of a control circuit 46 which comprises a second and a third comparator 12, 13 as well as a logic circuit 48. A non-inverting input terminal of the second comparator 12 and an inverting input terminal of the third comparator 13 are coupled to the supply voltage terminal 9. The first threshold voltage VthB is applied to an inverting input terminal of the second comparator 12 and the second threshold voltage VthiB is applied to a non-inverting input terminal of the third comparator 13. The output terminals of the second and the third comparator 12, 13 are coupled to a processing unit 60. The two output terminals of the second and the third comparator 12, 13 are also coupled to two inputs of the logic circuit 48. The output terminal of the logic circuit 48 is also coupled to the processing unit 60. The logic circuit 48 is realized as a NOR gate 49 or a circuit with a logically equivalent function comprising two input terminals which are connected to the output terminals of the second and the third comparator 12, 13 and an output terminal which is coupled to the processing unit 60.

The control circuit 46 further comprises a fourth comparator 56 with a first input terminal which is coupled to the output terminal 7 of the voltage converter 40 and a second input terminal to which a third threshold voltage Vth is applied. An output terminal of the third comparator 56 is connected to the processing unit 60. The first threshold voltage VthB is higher than the third threshold value Vth. The control input terminals 47, 47', 47" are also coupled to the processing unit 60. The control circuit 46 further comprises five buffers 51 to 55 which are provided for coupling the processing unit 60 to the five switches 41 to 45. The processing unit 60 may be realized as a digital circuit. The processing unit 60 can comprise digital logic gates. The processing unit 60 can comprise a flip-flop. The processing unit 60 can be implemented as a customized digital control logic circuit. The processing unit 60 can comprise a microcontroller.

The first pilot signal SP1 provides information about the polarity of the input voltage VIN to the processing unit 60 of the control circuit 46. The second and the third comparator 12, 13 provide the second and the third pilot signals SP2, SP3 respectively, and the logic circuit 48 provides the fourth pilot signal SP4 to the processing unit 60. If the second pilot signal SP2 assumes the high-state, then the processing unit 60 of the control circuit 46 sets the first mode of operation P1. The control circuit 46 sets the second mode of operation P2, if the third pilot signal SP3 is in the high-state. The fourth pilot signal SP4 is in the high-state if both the second and the third pilot signal SP2, SP3 are in the low state. The fourth pilot signal SP4 is in the low-state if one or both of the second and the third pilot signals SP2, SP3 are in the high state. If the fourth pilot signal SP4 assumes the high-state, then the control circuit 46 activates the third mode of operation P3 using the processing unit 60.

The sixth pilot signal SP6 provided by the fourth comparator 56 provides information whether the output voltage VOUT is above the third threshold voltage Vth or not, so that charging the capacitor 5 may be required or not. The processing unit 60 receives a seventh pilot signal SP7 provided by the switching array 58. The seventh pilot signal SP7 depends on the supply current IIN flowing through the supply voltage terminal 9 via the current feedback input terminal 59. The processing unit sets the positions of the five switches 41 to 45 depending on the received pilot signals and the received further signals.

The seventh pilot signal SP7 can be proportional to a current value of the supply current IIN. In case the current value of the supply current IIN is too large, the processing unit 60 sets the five switches 41 to 45 in such a mode of operation that a risk for the voltage generator arrangement and a load that is connected to the output terminal 7 is avoided. The processing unit 60 may control the five switches 41 to 45 according to the third mode of operation P3, if the supply current IIN is too large. Alternatively, the processing unit 60 may open the first, the fourth and the fifth switches 41, 44, 45 and close the second and the third switches 42, 43, in case the supply current IIN is too large. Thus, the processing unit 60 uses the seventh pilot signal SP7 to increase the safety of the voltage generator arrangement.

It is an advantage of the voltage generator arrangement that a large flexibility for generating the output voltage VOUT is achieved. Moreover, efficiency is improved significantly, especially for sinusoidal supply voltages VIN.

It is an advantage that the voltage generator arrangement is based on its input side and on its output side on the ground potential terminal 8 and, therefore, on a ground potential which can be tapped off at the ground potential terminal 8. Therefore, the polarity detection circuit 10 and the first comparator 11 within the polarity detection circuit 10 and, further on, the control circuit 46 and the second, the third and the fourth comparator 12, 13, 56, the logic circuit 48 and the processing unit 60 within the control circuit 46 can operate with reference to the ground potential terminal 8 and thus generate and process the signals with reference to the ground potential terminal 8 and to the ground potential.

In an alternative embodiment, the process unit 60 may be realized as a mixed digital and analog circuit.

The scope of protection of the invention is not limited to the examples given hereinabove. The invention is embodied in each novel characteristic and each combination of characteristics, which includes every combination of any features which are stated in the claims, even if this feature or combination of features is not explicitly stated in the examples.

The invention claimed is:

1. A voltage generator arrangement, comprising:
   a voltage converter, which is coupled to an output terminal and to a supply voltage terminal to which a supply voltage is provided with reference to a ground potential terminal and having a first mode of operation for a positive supply voltage and a second mode of operation for a negative supply voltage, the voltage converter providing an output voltage at the output terminal with reference to the ground potential terminal; and
   a polarity detection circuit, which is coupled to the supply voltage terminal and to a control input terminal of the voltage converter, for providing a first pilot signal depending on a polarity of the supply voltage,
   wherein the voltage converter comprises:
      a first inductor terminal and a second inductor terminal for coupling an inductor to the voltage converter, an output terminal of the voltage converter being coupleable to the second inductor terminal,
      a first switch coupling the supply terminal to the first inductor terminal,
      a second switch coupling the first inductor terminal to the ground potential terminal,
      a third switch coupling the second inductor terminal to the ground potential terminal,
      a fourth switch coupling the second inductor terminal to the output terminal, and
      a fifth switch coupling the first inductor terminal to the output terminal.

2. The voltage generator arrangement according to claim 1, wherein the voltage converter is configured to down convert the supply voltage.

3. The voltage generator arrangement according to claim 1, wherein the voltage converter is configured to convert supply voltages of arbitrary polarity.

4. The voltage generator arrangement according to claim 1, wherein the voltage converter comprises a control circuit which is connected to the control input terminal of the voltage converter and comprises at least one buffer, which is connected to a corresponding switch for providing a control signal to the corresponding switch.

5. The voltage generator arrangement according to claim 4, wherein the control circuit is configured to provide
   a second pilot signal with a first value, if the supply voltage is higher than a first threshold voltage, and with a second value, if the supply voltage is lower than the first threshold voltage, and
   a third pilot signal with a first value, if the supply voltage is lower than a second threshold voltage, and with a second value, if the supply voltage is higher than the second threshold voltage.

6. The voltage generator arrangement according to claim 5, wherein the second threshold voltage represents the inverted first threshold voltage.

7. The voltage generator arrangement according to claim 5, wherein the control circuit is configured to provide a fourth pilot signal with the first value, if the supply voltage is lower than the first threshold voltage and higher than the second threshold voltage, and with the second value, if the supply voltage is one of higher than the first threshold voltage and lower than the second threshold voltage.

8. The voltage generator arrangement according to claim 1, wherein the polarity detection circuit is coupled to a further control input terminal of the voltage converter for providing a validity signal.

9. The voltage generator arrangement according to claim 1, wherein the polarity detection circuit is configured to perform zero detection and is coupled to an additional control input terminal of the voltage converter for providing a fifth pilot signal with a first value, if the supply voltage is approximately zero.

10. A method for voltage conversion, comprising the steps of:
    providing a supply voltage with reference to a ground potential terminal;,
    detecting a polarity of the supply voltage;
    controlling a voltage converter depending on the polarity of the supply voltage; and
    generating an output voltage with reference to the ground potential terminal by means of the voltage converter;
    wherein controlling the voltage converter comprises controlling
       a first switch coupling a supply terminal to a first inductor terminal,
       a second switch coupling the first inductor terminal to a ground potential terminal,
       a third switch coupling a second inductor terminal to the ground potential terminal,
       a fourth switch coupling the second inductor terminal to an output terminal, and
       a fifth switch coupling the first inductor terminal to the output terminal,
       wherein an inductor is coupled between the first and the second inductor terminals.

11. The method according to claim 10, wherein the voltage converter comprises a direct current/direct current converter having a normal mode of operation and an inverting mode of operation.

12. The method according to claim 10, further comprising the step of comparing the supply voltage with a first threshold voltage and with a second threshold voltage.

13. The method according to claim 12, wherein controlling the voltage converter comprises setting the voltage converter
    (a) into a first mode of operation, if the supply voltage is higher than the first threshold voltage, and
    (b) into a second mode of operation, if the supply voltage is lower than the second threshold voltage.

14. The method according to claim 10, wherein controlling the voltage converter in the first mode of operation comprises:
    (a) controlling the first and the second switch depending on the supply voltage and depending on the output voltage of the voltage converter,
    (b) setting the third and the fifth switch into an open switching position, and (c) setting the fourth switch into a closed switching position, and
   wherein controlling the voltage converter in the second mode of operation comprises
   (d) controlling the first and the fifth switch depending on the supply voltage and depending on the output voltage of the voltage converter,
   (e) setting the second and the fourth switch into an open switching position, and
   (f) setting the third switch into a closed switching position.

15. The method according to claim 10, wherein controlling the voltage converter comprises setting the voltage converter into a third mode of operation, if the supply voltage is lower than the first threshold voltage and higher than the second threshold voltage, including
   setting the first, the fourth and the fifth switch into an open switching position, and
   setting the second switch and/or the third switch into a closed switching position.

16. A voltage generator arrangement, comprising:
   a voltage converter, which is coupled to an output terminal and to a supply voltage terminal to which a supply voltage is provided with reference to a ground potential terminal and having a first mode of operation for a positive supply voltage and a second mode of operation for a negative supply voltage, wherein the voltage converter provides an output voltage at the output terminal with reference to the ground potential terminal; and
   a polarity detection circuit, which is coupled to the supply voltage terminal and to a control input terminal of the voltage converter, for providing a first pilot signal depending on the polarity of the supply voltage,
wherein the voltage converter comprises:
   a first inductor terminal and a second inductor terminal for coupling an inductor to the voltage converter, an output terminal of the voltage converter being coupleable to the second inductor terminal,
   a first switch coupling the supply terminal to the first inductor terminal,
   a second switch coupling the first inductor terminal to the ground potential terminal, and
   a control circuit which is connected to the control input terminal of the voltage converter and comprises at least one buffer, which is connected to a corresponding switch for providing a control signal to the corresponding switch,
wherein the control circuit is configured to provide
   a second pilot signal with a first value, if the supply voltage is higher than a first threshold voltage, and with a second value, if the supply voltage is lower than the first threshold voltage, and
   a third pilot signal with a first value, if the supply voltage is lower than a second threshold voltage, and with a second value, if the supply voltage is higher than the second threshold voltage.

* * * * *